(12) United States Patent
Li et al.

(10) Patent No.: US 9,912,927 B2
(45) Date of Patent: Mar. 6, 2018

(54) METHOD FOR ADJUSTING WHITE BALANCE AND DEVICE

(71) Applicant: NUBIA TECHNOLOGY CO., LTD., Shenzhen, Guangdong (CN)

(72) Inventors: Qiang Li, Shenzhen (CN); Yunze Zhao, Shenzhen (CN)

(73) Assignee: Nubia Technology Co., LTD. (CN)

(*) Notice: Subject to any disclaimer, the term of this patent is extended or adjusted under 35 U.S.C. 154(b) by 0 days.

(21) Appl. No.: 15/028,345

(22) PCT Filed: May 6, 2014

(86) PCT No.: PCT/CN2014/076910
§ 371 (c)(1),
(2) Date: Apr. 8, 2016

(87) PCT Pub. No.: WO2015/067015
PCT Pub. Date: May 14, 2015

(65) Prior Publication Data
US 2016/0269706 A1    Sep. 15, 2016

(30) Foreign Application Priority Data

Nov. 8, 2013 (CN) .......................... 2013 1 0557312

(51) Int. Cl.
*H04N 9/73* (2006.01)
*H04N 1/60* (2006.01)
(Continued)

(52) U.S. Cl.
CPC ............ *H04N 9/73* (2013.01); *H04N 1/6086* (2013.01); *H04N 5/23293* (2013.01); *H04N 9/643* (2013.01)

(58) Field of Classification Search
CPC ............ H04N 1/6086; H04N 5/23212; H04N 5/23216; H04N 5/23293; H04N 5/2351;
(Continued)

(56) References Cited

U.S. PATENT DOCUMENTS 7,679,684 B2    3/2010  Miura
7,844,174 B2 *  11/2010 Pickens .................. G03B 13/32
                                                         396/121
(Continued)

FOREIGN PATENT DOCUMENTS

CN    1956550 A    5/2007
CN    1918919 A    7/2007
(Continued)

OTHER PUBLICATIONS

English Translation of the Written Opinion of the International Search Authority in international application No. PCT/CN2014/076910, dated Jul. 31, 2014, 13 pages.
(Continued)

*Primary Examiner* — Lin Ye
*Assistant Examiner* — Chriss Yoder, III
(74) *Attorney, Agent, or Firm* — Eric L. Sophir; Dentons US LLP (57) ABSTRACT

A method and device for adjusting white balance are provided. The method includes acquiring a user-defined color temperature value, and adjusting white balance according to the color temperature value and a preset algorithm. Thus, a user may acquire various white balance effects through adjustment according to preferences, take individualized photographs with various effects, thereby satisfying individual requirements of the user. The user may also lock the white balance adjusted currently, and the white balance is automatically applied to another photographing environment, so as to acquire a special photograph effect, thus
(Continued)

enabling the user to acquire a photograph with a unique artistic effect according to an individual requirement, and greatly improving the user experience.

12 Claims, 6 Drawing Sheets

(51) Int. Cl.
 *H04N 9/64* (2006.01)
 *H04N 5/232* (2006.01)
(58) Field of Classification Search
 CPC ...... H04N 9/643; H04N 9/73; G06F 3/04812; G06F 3/04842; G06F 3/04845; G06F 3/04886
 See application file for complete search history.

(56) References Cited

U.S. PATENT DOCUMENTS

| | | | |
|---|---|---|---|
| 8,045,014 B2 * | 10/2011 | Fujiwara | H04N 5/23219 348/222.1 |
| 8,259,208 B2 * | 9/2012 | Ciurea | G06F 3/0488 345/173 |
| 2004/0017594 A1 * | 1/2004 | Suekane | H04N 1/6027 358/516 |
| 2007/0126934 A1 | 6/2007 | Miura | |
| 2008/0062274 A1 | 3/2008 | Hamamura | |
| 2008/0175579 A1 | 7/2008 | Kawakami | |
| 2011/0050927 A1 | 3/2011 | Nagoya | |
| 2011/0285745 A1 * | 11/2011 | Zhang | G06F 3/0488 345/593 |
| 2013/0113957 A1 | 5/2013 | Hamada | |
| 2013/0258126 A1 | 10/2013 | Nagoya | |

FOREIGN PATENT DOCUMENTS

| | | |
|---|---|---|
| CN | 103096096 A | 5/2013 |
| JP | 2001112021 A | 4/2001 |
| JP | 2004048523 A | 2/2004 |
| JP | 2004172817 A | 6/2004 |
| JP | 2005064630 A | 3/2005 |
| JP | 2006203557 A | 8/2006 |
| JP | 2006238369 A | 9/2006 |
| JP | 2006279459 A | 10/2006 |
| JP | 2007116589 A | 5/2007 |
| JP | 2007201582 A | 8/2007 |
| JP | 2008072297 A | 3/2008 |
| JP | 2008249891 A | 10/2008 |
| JP | 2009004895 A | 1/2009 |
| JP | 2010028452 A | 2/2010 |
| JP | 2013157845 A | 8/2013 |
| KR | 20130050158 A | 5/2013 |

OTHER PUBLICATIONS

International Search Report dated Jul. 30, 2014 in International Application No. PCT/CN2014/076910 (4 pages).
Korean Second Office Action dated Jun. 20, 2017 (with English Translation) in Korean Application No. 10-2016-7009820, 7 pages.
Japanese Office Action dated Apr. 25, 2017 in Japanese Application No. 2016-522754, 5 pages.
Supplementary European Search Report in European application No. 14860890.4, dated Mar. 22, 2017, 11 pages.
Partial Supplementary European Search Report in European application No. 14860890.4, dated Dec. 21, 2016, 6 pages.

* cited by examiner

METHOD FOR ADJUSTING WHITE BALANCE AND DEVICE

CROSS REFERENCE TO RELATED APPLICATIONS

This application is a 371 National Stage Application of International Application No. PCT/CN2014/076910, filed May 6, 2014, which claims priority to Chinese Patent Application No. 201310557312.8, filed Nov. 8, 2013, the contents of which are incorporated herein by reference in their entirety.

TECHNICAL FIELD

The present disclosure relates to the field of photographic techniques, particularly to a method and device for adjusting white balance.

BACKGROUND

In order to get a good photographic effect, white balance setting is necessary when taking a photograph. Nowadays, the society develops and becomes mere and more diversified. During a photographing process or photograph creation, users wish that the photos can get highly individualized effect and can present various effects as he/she wishes. An existing method for adjusting white balance generally includes an automatic adjustment mode and a preset environment adjustment mode. However, the automatic adjustment mode adjusts white balance automatically according to a change of an external environment and does not allow user interference. The preset environment adjustment mode only provides a limited number of environment modes including an incandescence mode, an overcast mode, a fluorescence mode and so on. Thus, in the preset environment adjustment mode, it is hard to acquire various highly-individualized photographic works. The individual needs of users cannot be satisfied.

SUMMARY

The present disclosure is to provide a method and device for adjusting white balance so as to satisfy an individual need of a user and acquire an individualized photographic work.

The present disclosure provides a method for adjusting white balance so as to achieve the purpose above, including steps of:

a colour temperature value defined by a user is acquired; and white balance is adjusted according to the colour temperature value defined by the user and a preset algorithm.

Preferably, the step that the colour temperature value defined by the user is acquired may include that:

an interface for inputting a user-defined colour temperature value is displayed; and a colour temperature value inputted by the user in the interface for inputting a user-defined colour temperature value is acquired.

Preferably, the step that the colour temperature value defined by the user is acquired may include that:

a selection box for a user-defined colour temperature value is displayed;

a screen area defined by the selection box for a user-defined colour temperature value is detected; and a colour temperature value of an image of the screen area is acquired.

Preferably, the step that the user-defined colour temperature value is acquired may include that:

a selection box for a user-defined colour temperature value is displayed;

a screen area in the selection box for a user-defined colour temperature value and a screen area outside the selection box for a user-defined colour temperature value are detected; and a weighted average value of a colour temperature value of an image of the screen area in the selection box for a user-defined colour temperature value and a colour temperature value of an image of the screen area outside the selection box for a user-defined colour temperature value is acquired.

Preferably, after the step that the white balance is adjusted according to the user-defined colour temperature value and the preset algorithm, the method may further include that the adjusted white balance is locked.

Preferably, after the step that the user-defined colour temperature value is acquired, the method may further include that precision of the white balance is calibrated.

The present disclosure further provides a method for adjusting white balance, including steps of:

a selection box for a user-defined colour temperature value is displayed;

a screen area defined by the selection box for a user-defined colour temperature value is detected;

a colour temperature value of an image in the screen area is acquired; and white balance is adjusted according to the colour temperature value and a preset algorithm.

Moreover, the present disclosure provides a device for adjusting white balance, including an acquiring module and an adjusting module, wherein the acquiring module is configured to acquire a colour temperature value defined by a user; and the adjusting module is configured to adjust the white balance according to the colour temperature value defined by the user and a preset algorithm.

Preferably, the acquiring module may include a displaying unit and a detecting unit, wherein the displaying unit is configured to display an interface for inputting a user-defined colour temperature value; and the detecting unit is configured to detect a colour temperature value inputted by the user on the interface for inputting a user-defined colour temperature value.

Preferably, the acquiring module may include a displaying unit and a detecting unit, wherein the displaying unit is configured to display a selection box for a user-defined colour temperature value; and the detecting unit is configured to detect a screen area defined by the selection box for a user-defined colour temperature value and acquire a colour temperature value of an image in the screen area.

Preferably, the acquiring module may include a displaying unit and a detecting unit, wherein the displaying unit is configured to display a selection box for a user-defined colour temperature value; and the detecting unit is configured to detect a screen area in the selection box for a user-defined colour temperature value and a screen area outside the selection box for a user-defined colour temperature value, and to acquire a weighted average value of a colour temperature value of an image in the screen area in the selection box for a user-defined colour temperature value and a colour temperature value of an image in the screen area outside the selection box for a user-defined colour temperature value.

Preferably, the adjusting module may be configured to lock the adjusted white balance.

Preferably, the device for adjusting white balance may further include a calibrating module and the calibrating module is configured to calibrate precision of the white balance.

According to the methods for adjusting white balance provided by the present disclosure, a user-defined colour temperature value is acquired, and white balance is adjusted according to the user-defined colour temperature value. Thus, a user may acquire various white balance effects through adjustment according to preferences of the user, thereby taking individualized photographs with various effects, and satisfying individual requirements of the user. The user may also lock the white balance adjusted currently, and the white balance is automatically applied to another photographing environment, thus acquiring a special photograph effect which enables the user to acquire a photograph with a unique artistic effect according to an individual requirement, and greatly improves the user experience.

Implementation of the purpose, functional characteristics, and advantages of the present disclosure will be further described in combination with the embodiments and with reference to the accompanying drawings.

DETAILED DESCRIPTION

It should be understood that the specific embodiments described herein are only used for explaining the present disclosure, instead of limiting the present disclosure.

Figure 1:
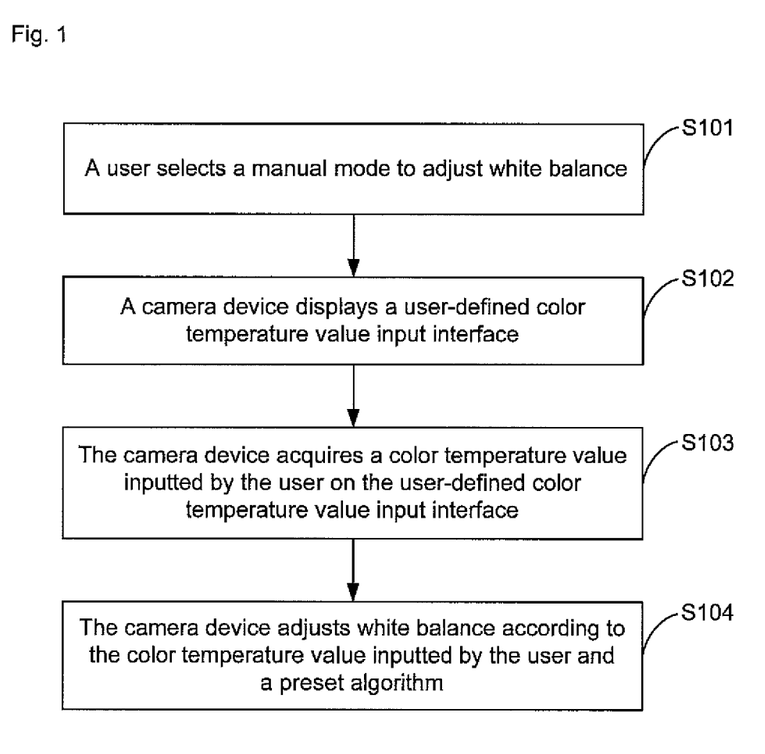
FIG. 1 is a flowchart of a method for adjusting white balance according to a first embodiment of the present disclosure.

Referring to FIG. 1, the first embodiment of a method for adjusting white balance of the present disclosure is proposed. The method for adjusting white balance is applied to a camera device, such as a mobile phone, a camera, and a tablet computer. The method for adjusting white balance includes the following steps.

Step S101: A user selects a manual mode to adjust white balance.

Figure 2:
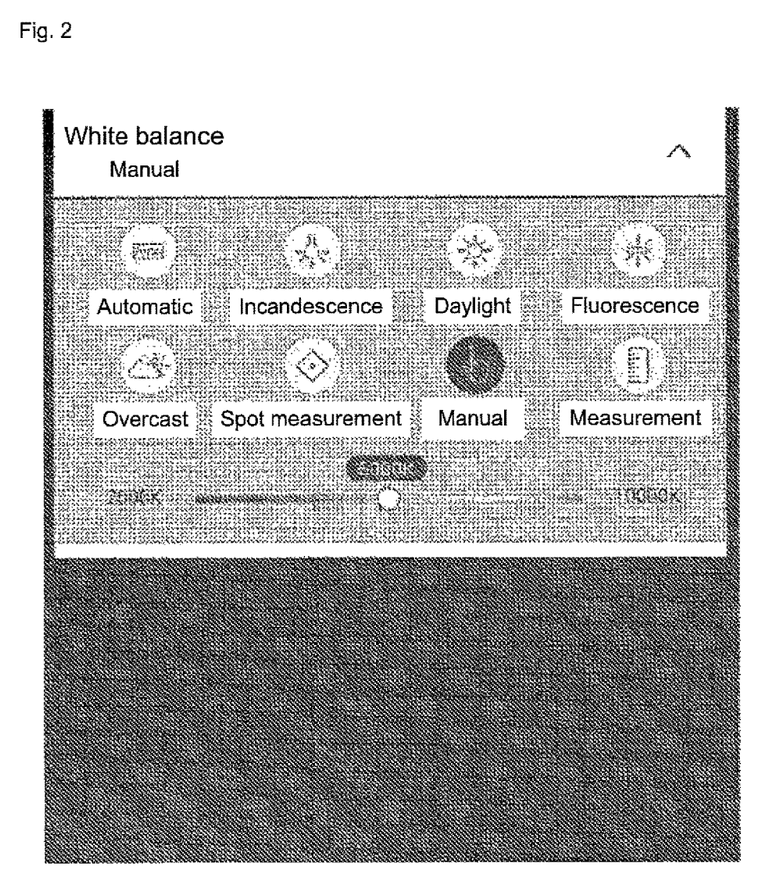
FIG. 2 is a schematic diagram of an interface for adjusting white balance in a manual mode in the present disclosure.

As shown in FIG. 2, after a camera device enters a white balance adjustment interface, a plurality of white balance adjustment modes are displayed to a user for selection, including an automatic adjustment mode, a preset environment mode and a user-defined mode. The automatic adjustment mode and the preset environment mode are common modes in the traditional art. The preset environment mode includes an incandescence mode, a daylight mode, a fluorescence mode and an overcast mode. The user-defined mode includes a spot measurement mode and a manual mode. The user is allowed to input a specific colour temperature value to adjust white balance. The user selects the manual mode by touching or clicking on a manual button.

Step S102: The camera device displays an interface for inputting a user-defined colour temperature value.

The camera device displays an interface for inputting a user-defined colour temperature value as soon as the user selects the manual mode. As shown in FIG. 2, the interface for inputting a user-defined colour temperature value is a colour temperature adjustment progress bar. The interface for inputting a user-defined colour temperature value may be also a colour temperature value input box in some embodiments.

Step S103: The camera device acquires a colour temperature value inputted by the user on the interface for inputting a user-defined colour temperature value.

When the interface for inputting a user-defined colour temperature value is a colour temperature adjustment progress bar, the user may drag a button on the progress bar to increase or reduce a colour temperature value, or touch or click on a certain place of the progress bar to select a colour temperature value. When the interface for inputting a user-defined colour temperature value is a colour temperature value input box, the user may input a colour temperature value in the input box directly, and the camera device acquires the user-inputted colour temperature value immediately.

Step S104: The camera device adjusts white balance according to the colour temperature value inputted by the user and a preset algorithm.

The camera device uses a user-defined colour temperature as a reference colour temperature, and adjusts the white balance according to a preset algorithm. Those skilled in the art may understand that the preset algorithm may be a conventional algorithm for adjusting white balance in the traditional art, and will not be described repeatedly here. Thus, the user may acquire various white balance effects through adjustment according to preferences of the user, so as to take photographs with various effects.

Figure 3:
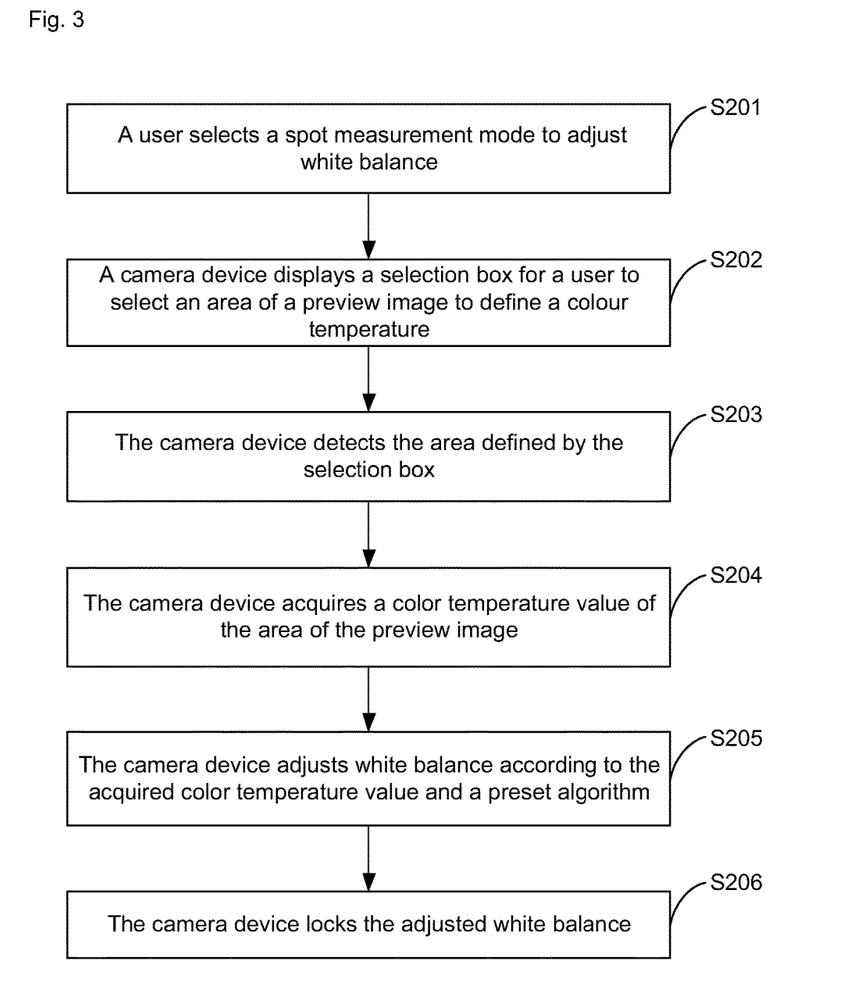
FIG. 3 is a flowchart of a method for adjusting white balance according to a second embodiment of the present disclosure.

Referring to FIG. 2, the second embodiment of a method for adjusting white balance of the present disclosure is proposed. The method for adjusting white balance includes the following steps.

Step S201: A user selects a spot measurement mode to adjust white balance.

Figure 4:
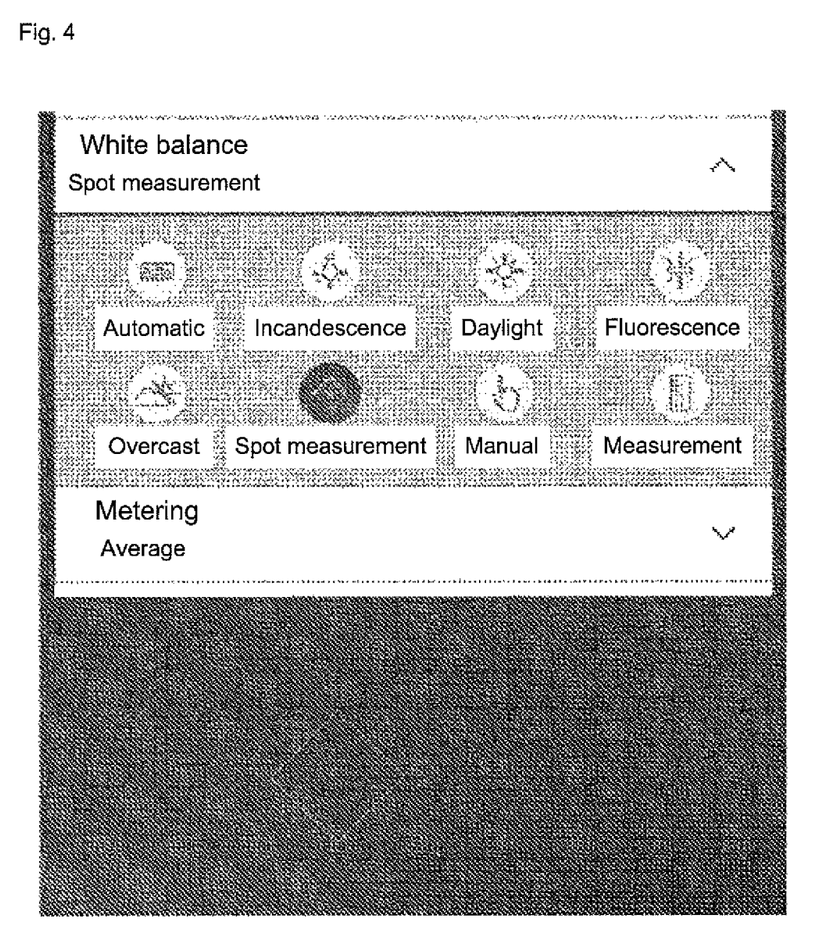
FIG. 4 is a schematic diagram of an interface for adjusting white balance in a spot measurement mode in the present disclosure.

As shown in FIG. 4, a user touches or clicks on a spot measurement button to select a spot measurement mode to perform user-defined adjustment on white balance.

Step S202: A selection box for a user to select an area of a preview image to define a colour temperature is displayed on a camera device.

Hereupon, the camera device displays a user-defined colour temperature value selection box on a preview image. The selection box as shown in the figure has a rhombic shape, or it may also have other shapes including a circular shape, a polygonal shape, a triangular shape, a rectangular shape and so on. The user may select the area of the preview image to define a colour temperature by moving and/or resizing the selection box, e.g., dragging the selection box, zooming in/out an area within the selection box.

Step S203: The camera device detects the area defined by the selection box.

Step S204: The camera device acquires a colour temperature value of the area of the preview image.

The preview window displays a preview image of a scene photographed by the camera device. The present disclosure allows the user to select a part of the preview image by the selection box for a user to select an area of a preview image to define a colour temperature, and acquire a colour temperature value of the selected part. In some embodiments, the camera device may also import a locally stored image into the preview window, so that the user can select a colour temperature value of a part of the image. When there are a plurality of selection boxes, colour temperature values of images in regions defined by the plurality of selection boxes are calculated comprehensively. For example, an average value or a weighted average value of the colour temperature values is calculated.

Step S205: The camera device adjusts white balance according to the acquired colour temperature value and a preset algorithm.

After acquiring the colour temperature value of the selected part of the image, the camera device applies the colour temperature value to the whole photographed preview image, uses the colour temperature value as a reference colour temperature for adjusting the white balance of the whole preview image, and then adjusts the white balance according to a preset algorithm. Thus, the user may acquire photographs of various effects.

For example, there is a small yellow flower in the photographed preview image, and the user moves the selection box on a screen to select the small yellow flower, thereby acquiring a colour temperature value of the small yellow flower. The colour temperature value of the small yellow flower is applied to the whole photographed preview image as a reference colour temperature for adjusting the white balance of the whole preview image and the white balance is adjusted subsequently according to a preset algorithm.

Step S206: The camera device locks the adjusted white balance.

After adjusting the white balance, if the user is satisfactory about the current white balance effect, the user may further lock a value of the current adjusted white balance. The camera device memorizes the white balance value, and automatically applies the same to other photographing environments so as to prevent the white balance from changing with a change of an environment. A special photograph effect may be acquired using the white balance locking function, and the user may acquire a photograph with a unique artistic effect according to an individual requirement.

For example, after acquiring a white balance value corresponding to an environment with a low colour temperature (e.g. 2700K) through an automatic mode, a preset environment mode or a user-defined mode, the user locks the white balance value, and then moves the camera device to take a photograph in an environment having a medium colour temperature (5000K), thus taking a photograph having a relatively cold image effect.

Figure 5:
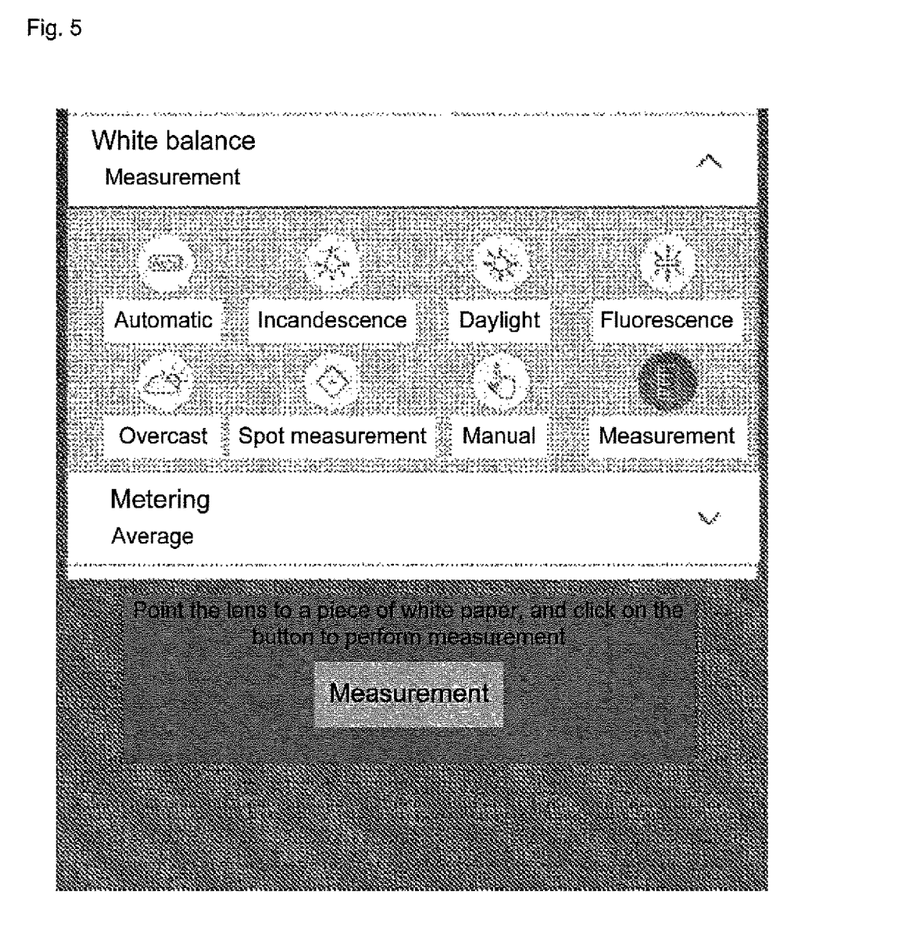
FIG. 5 is a schematic diagram of an interface for calibrating the precision of white balance in the present disclosure.

Affected by complicated external environment factors, the precision of the white balance of the camera device may be inaccurate sometimes. Therefore, the precision of the white balance may be also calibrated before the white balance is adjusted automatically in the first embodiment and the second embodiment. As shown in FIG. 5, after a measurement button is touched or clicked, the lens of the camera device is pointed to a piece of white paper, a gray card or a white object, a measurement button popping up from the preview window is clicked subsequently, and the camera device calibrates the precision of the white balance immediately. The white balance adjusted in such a manner is more precise, thus improving the photographing effect.

In some embodiments, after the user uses the selection box to select a certain area of the screen, the camera device comprehensively calculates a colour temperature value of an image in the area defined by the selection box and a colour temperature value of an image in another area outside the selection box. For example, the camera device acquires an average value or a weighted average value of a colour temperature value of an image in a screen area in the selection box and a colour temperature value of an image in a screen area outside the selection box. For example, given that a colour temperature value of an image in an area defined by the selection box is A while a colour temperature value of an image in another area is B, then an overall colour temperature value M may be acquired by A and B, and $M=\alpha A+\beta b$, where a is a weighting coefficient of A and $\beta$ is a weighting coefficient of B ($\alpha$ and $\beta$ may be adjusted as required), then the white balance is adjusted according to the overall colour temperature value M and the preset algorithm. Or there are at least two said selection boxes, and colour temperature values of images in areas defined by the selection boxes are A, B . . . , then an overall colour temperature value M is equal to $\alpha A+\beta B+$ . . . , and then the white balance is adjusted according to the overall colour temperature value M and the preset algorithm.

The method for adjusting white balance may be also correspondingly applied to adjustment of parameters including ISO, exposure compensation, manual focusing, manual exposure time adjustment, contrast, saturation, sharpness and so on.

Thus, according to a method for adjusting white balance of the present disclosure, a user-defined colour temperature value is acquired, and white balance is adjusted according to the user-defined colour temperature value. Thus, a user may acquire various white balance effects through adjustment according to preferences of the user, so as to take individualized photographs with various effects, thereby satisfying individual requirements of the user. The user may also lock the white balance adjusted currently, a camera device memorizes the white balance, and the white balance is automatically applied to another photographing environment, so as to acquire a special photograph effect so that the user can acquire a photograph with a unique artistic effect according to an individual requirement, thereby greatly improving the user experience.

Figure 6:
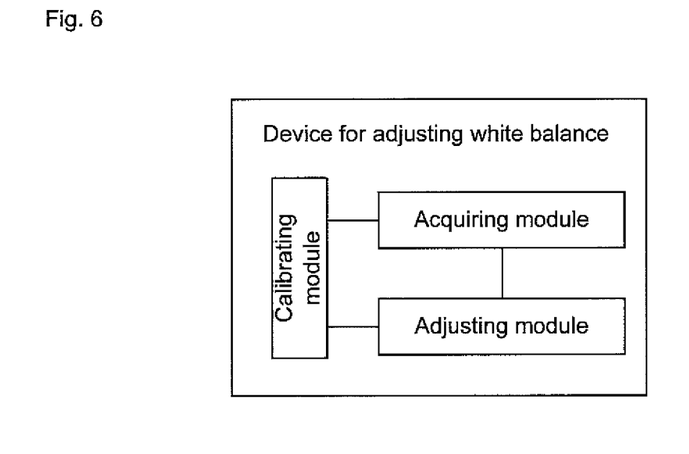
FIG. 6 is a structural block diagram of a device for adjusting white balance according to an embodiment of the present disclosure.
Figure 7:
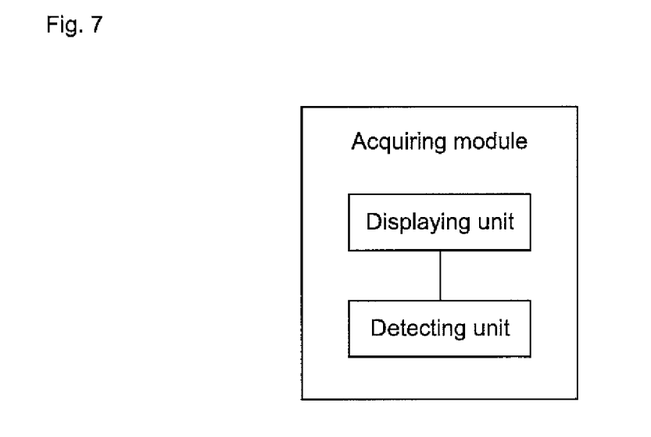
FIG. 7 is a structural block diagram of an acquiring module in FIG. 6.

Referring to FIG. 6 and FIG. 7, an embodiment of a device for adjusting white balance of the present disclosure is proposed. The device for adjusting white balance may be applied to a camera device including a camera, a mobile phone, a table computer and so on, and includes an acquiring module, an adjusting module and a calibrating module.

The acquiring module is configured to acquire a colour temperature value, including a colour temperature value acquired by automatically detecting a current environment, a user-defined colour temperature value and a preset colour temperature value. White balance adjustment modes of the present disclosure include an automatic adjustment mode, a preset environment mode and a user-defined mode. When a user selects the automatic adjustment mode to adjust white balance, the acquiring module detects a current environment automatically to acquire a colour temperature value. When the user selects the user-defined mode to adjust white balance, the acquiring module acquires a user-defined colour temperature value. When the user selects the preset environment mode to adjust white balance, the acquiring module acquires a locally-stored colour temperature value of a preset environment.

The adjusting module is configured to adjust white balance according to the colour temperature value acquired by the acquiring module and a preset algorithm. When the acquiring module acquires a user-defined colour temperature value, the adjusting module uses the user-defined colour temperature value as a reference colour temperature and adjusts the white balance according to the preset algorithm. Thus the user may acquire various white balance effects through adjustment according to preferences of the user, so as to take photographs with various effects.

Preferably, the adjusting module may be further configured to lock the adjusted white balance and automatically apply a value of the white balance to other photographing environments so as to prevent the white balance from changing with a change of an environment. After the user adjusts the white balance through the automatic mode, the preset environment mode or the user-defined mode, the adjusting module may lock the adjusted white balance as required by the user. A special photograph effect may be acquired using the white balance locked function, and the user may acquire a photograph with a unique artistic effect according to an individual requirement.

The calibrating module is configured to calibrate the precision of the white balance according to a white or gray colour temperature value acquired by the acquiring module, and send a calibrated parameter to the adjusting module. Affected by complicated external environment factors, the precision of the white balance of the camera device may be inaccurate sometimes. After the precision of the white balance is calibrated by the calibrating module, the white balance adjusted by the adjusting module is more precise, thus improving the photographing effect.

As shown in FIG. 7, the acquiring module includes a displaying unit and a detecting unit, wherein the displaying unit is configured to display a white balance adjustment interface. As shown in FIG. 2, FIG. 4 and FIG. 5, the white balance adjustment interface displays various white balance adjustment modes for the user to select, including an automatic adjustment mode, a preset environment mode, and a user-defined mode. The automatic adjustment mode and the preset environment mode are common modes in the traditional art. The preset environment mode includes an incandescence mode, a daylight mode, a fluorescence mode and an overcast mode. The user-defined mode includes a spot measurement mode and a manual mode. The user is allowed to input a specific colour temperature value to adjust the white balance. The user selects various white balance adjustment modes by touching or clicking on corresponding buttons.

As shown in FIG. 2, the displaying unit displays an interface for inputting a user-defined colour temperature value as soon as the user selects the manual mode. The interface for inputting a user-defined colour temperature value is a colour temperature adjustment progress bar. The interface for inputting a user-defined colour temperature value may be also a colour temperature value input box in some embodiments. When the interface for inputting a user-defined colour temperature value is a colour temperature adjustment progress bar, the user may drag a button on the progress bar to increase or reduce a colour temperature value, or touch or click on a certain place of the progress bar to select a colour temperature value. When the interface for inputting a user-defined colour temperature value is a colour temperature value input box, the user may input a colour temperature value in the input box directly.

As shown in FIG. 4, the displaying unit displays a selection box for a user to select an area of a preview image to define a colour temperature in an image preview window as soon as the user selects the spot measurement mode. The selection box as shown in the figure has a rhombic shape, it may also has other shapes including a circular shape, a polygonal shape, a triangular shape, a rectangular shape and so on. The user may select the area of the preview image to define a colour temperature by moving and/or resizing the selection box, e.g., dragging the selection box, zooming in/out a region within the selection box.

As shown in FIG. 5, after a measurement button is touched or clicked, the displaying unit displays a calibrating interface. A dialogue box pops up as shown in the figure to prompt the user to point the lens to a piece of white paper, a gray card or a white object, and a measurement button is displayed. After the user is ready, the measurement button may be clicked and the calibrating module can calibrate the precision of the white balance immediately.

The detecting unit is configured to detect a colour temperature value, including detecting a colour temperature value in a current environment, and a colour temperature value inputted by the user in a user-defined manner. When the user selects the automatic mode to adjust the white balance, the detecting unit automatically detects a colour temperature value in a current environment. When the user selects the user-defined mode to adjust the white balance, the detecting unit detects a colour temperature value inputted by the user in a user-defined manner. For example, when the user selects the automatic mode, the detecting unit detects a colour temperature value inputted by the user on for inputting a user-defined colour temperature value, including a colour temperature value selected by the user on a colour temperature adjustment progress bar or a colour temperature value inputted by the user in a colour temperature value input box, and so on; when the user selects the spot measurement mode, the detecting unit detects a region defined by the selection box and acquires a colour temperature value of a preview in the screen area. The image in the region may be a preview image photographed by the camera device, or an image which is locally stored by the camera device and displayed in the preview window.

According to the device for adjusting white balance of the present disclosure, a user-defined colour temperature value is acquired, and the adjusting module adjusts white balance according to the user-defined colour temperature value. Thus, a user may acquire various white balance effects through adjustment according to preferences of the user, thereby taking individualized photographs with various effects, and satisfying individual requirements of the user. The adjusting module may also lock the current adjusted white balance according to a requirement of the user, and the white balance is automatically applied to another photographing environment, so as to acquire a special photograph effect which enables the user to acquire a photograph with a unique artistic effect according to an individual requirement, thereby greatly improving the user experience.

The method and device for adjusting white balance may further include the follow examples.

Example 1

A device for adjusting white balance includes a displaying unit module, a receiving unit module and a processing unit module.

The displaying unit module is configured to display an image, wherein the image may be an image captured by a camera of a camera device, an image received by the camera, or an image stored in the device for adjusting white balance; the image here may be also a video, referred to as an image collectively. There may be one, two or more cameras. The camera is placed outside the device for adjusting white balance. The camera may be a front camera or a rear camera, or may be also a separate camera connected with the displaying unit module by a data wire.

The displaying unit module may be a liquid crystal display screen or an Organic Light-Emitting Diode (OLED) display screen.

The displaying unit module may display one or more images. For example, one, two or more images are displayed on a display screen.

The receiving unit module is configured to receive an instruction for operating an image displayed on the displaying unit module, wherein the instruction may be an instruction about a gesture operation, and may be also a voice control/voice instruction, or an instruction inputted by touch control. The instruction includes an instruction for dragging or clicking on a displayed and selected pattern to select a colour temperature reference location, or an instruction for clicking on a displayed image directly to select a colour temperature reference location. The receiving unit may be a mouse, a keyboard, a microphone, a touch control panel, a projector or various combinations of the above.

The processing unit module is configured to select, according to the instruction received by the receiving unit module, a colour temperature reference location. The size of the colour temperature reference location is adjustable. An instruction inputted by touch control utilizes a finger to touch on a screen of the displaying unit module for displaying an image, so as to select the colour temperature reference location, then acquires a colour temperature value of an image covered by the colour temperature reference location, and adjusts the white balance according to the colour temperature value and a preset algorithm.

For example, a first image transmitted by the camera is displayed on the screen of the displaying unit module.

A user operates on the upward side of the screen of the displaying unit module with a finger. For example, the finger drags a selected pattern on the first image. The selected pattern may have a rhombic shape, a circular shape, a triangular shape, a rectangular shape and so on. The receiving unit module receives an instruction from the user to drag the selected pattern on the first image. The processing unit selects a colour temperature reference location according to the instruction, and then adjusts white balance according to a colour temperature value of an image covered by the colour temperature reference location.

Subsequently, a second image transmitted by the camera is displayed on the screen of the displaying unit module. The second image and the first image are photographed continuously.

The processing unit module sets the colour temperature value of the colour temperature reference location on the first image as a reference colour temperature value of the second image, and adjusts the white balance according to the reference colour temperature value.

Preferably, images are further photographed continuously so as to acquire a third image, a fourth image and so on, and all images apply the colour temperature value of the colour temperature reference location on the first image as reference colour temperature values of these images, to adjust white balance.

Example 2

The second example is substantially the same as the first embodiment and what is difference is that:

when images are photographed continuously in the first embodiment, the colour temperature value of the colour temperature reference location on the first image is applied as reference colour temperature values of subsequent images to adjust white balance;

in the second embodiment, however, the subsequent images apply the colour temperature reference location on the first image as colour temperature reference locations of the subsequent images when the images are photographed continuously, and colour temperature values are adjusted according to their colour temperature reference locations to adjust the white balance.

Example 3

The third example is substantially the same as the first embodiment and what is difference is that:

when images are photographed continuously in the first embodiment, the colour temperature value of the colour temperature reference location on the first image is applied as reference colour temperature values of subsequent images, and the images are photographed.

in the third embodiment, however, the number of first images is m and the number of second images is n. At least one of m and n is an integer larger than or equal to 2. The first images and the second images are photographed continuously. The first images are several images photographed based on the same location while the second images are several images based on the same location. If the number of the first images is larger than or equal to 2, all the first images have different colour temperature reference locations from each other, or if the number of the second images is larger than or equal to 2, all the second images have different colour temperature reference locations from each other.

Each of the m first images is an image photographed after dragging a selected pattern with a finger and selecting a colour temperature reference location to adjust white balance according to a colour temperature value at the colour temperature reference location.

Each of the n second images is an image photographed after dragging a selected pattern with a finger and selecting a colour temperature reference location to adjust white balance according to a colour temperature value at the colour temperature reference location.

A processing unit selects an image among the m first images and matches the image with an image among the n second images so as to form images photographed continuously.

Preferably, the processing unit module may match two images satisfying a preset function among the m first images and the n second images.

Preferably, the processing unit may match two images having the same average brightness value or white balance effect among the m first images and the n second images.

Preferably, the processing unit may match two images having the same weighted brightness value or white balance parameter weighted value among the m first images and the n second images.

Example 4

A method for adjusting white balance includes the following steps.

Step S1: A first image is displayed.

In this step, the first image may be an image captured by a camera, an image received by the camera or an image stored in a camera device.

Step S2: An instruction for operating the displayed first image is received.

In this step, the instruction includes an instruction for selecting a colour temperature reference location.

Step S3: A colour temperature reference location of the first image is selected according to the received instruction, and white balance is adjusted according to a colour temperature value of the colour temperature reference location on the first image.

Step S4: A second image is photographed according to the colour temperature value of the colour temperature reference location on the first image.

In this step, the colour temperature reference location is selected according to the received instruction for selecting the colour temperature reference location. The step that the colour temperature reference location is selected further includes that:

a displayed and selected pattern is dragged or clicked to select a colour temperature reference location, and/or the displayed image is clicked directly to select a colour temperature reference location.

In other embodiments, there are at least two colour temperature reference locations on the first image or the second image.

Example 5

A method for adjusting white balance includes the following steps.

Step 1: Images are displayed.

In this step, the images may be images captured by a camera, images received by the camera or images stored in a camera device.

Step 2: An instruction for operating the displayed images is received and the displayed images include first images and second images.

In this step, the instruction includes an instruction for selecting a colour temperature reference location.

Step 3: A colour temperature reference location of the first images and a colour temperature reference location of the second images are selected according to the received instruction, and an image is selected among the first images to match an image among the second images to form pictures photographed continuously.

There are m first images and n second images, and at least one of m and n is an integer larger than or equal to 2. The first images and the second images are photographed continuously. The first images are several images photographed based on the same location while the second images are several images based on the same location. If the number of the first images is larger than or equal to 2, all the first images have different colour temperature reference locations from each other, or if the number of the second images is larger than or equal to 2, all the second images have different colour temperature reference locations from each other.

Each of the m first images is an image photographed after dragging a selected pattern with a finger and selecting a colour temperature reference location.

Each of the n second images is an image photographed after dragging a selected pattern with a finger and selecting a colour temperature reference location.

A processing unit selects an image among the m first images and matches the image with an image among the n second images so as to form images photographed continuously.

Preferably, the processing unit module may match two images satisfying a preset function among the m first images and the n second images.

Preferably, the processing unit may match two images having the same average brightness value or white balance effect among the m first images and the n second images.

Preferably, the processing unit may match two images having the same weighted brightness value or white balance parameter weighted value among the m first images and the n second images.

Similarly, the method for adjusting white balance may be also correspondingly applied to adjustment of parameters including ISO, exposure compensation, manual focusing, manual exposure time adjustment, contrast, saturation, sharpness and so on.

According to an embodiment of the present disclosure, when a user utilizes the present disclosure to photograph images continuously and compose the images, the images photographed continuously are closely related to each other, so that the images photographed continuously can be well matched, thereby improving the display quality of the images.

Those of ordinary skill in the art may understand that all or part of the steps for implementing the methods of the embodiments above may be completed by related hardware controlled by a program. The program may be stored in a computer-readable storage medium. The storage medium may be a Read-Only Memory (ROM)/Random-Access Memory (RAM), a magnetic disk, an optical disk and so on.

The preferred embodiments of the present disclosure have been described above with reference to the accompanying drawings, but the scope of claims of the present disclosure is not limited thereby. Those skilled in the art may implement the present disclosure with various variant solutions without departing from the scope and essence of the present disclosure. For example, characteristics of one embodiment may be applied to another embodiment to acquire still another embodiment. Any modifications, equivalent replacements and improvements made without the technical concept of the present disclosure should be within the patent scope of the present disclosure.

INDUSTRIAL APPLICABILITY

According to a method and device for adjusting white balance of the present disclosure, a user-defined colour temperature value is acquired, and white balance is adjusted according to the user-defined colour temperature value. Thus, a user may acquire various white balance effects through adjustment according to preferences of the user, thereby taking individualized photographs with various effects, and satisfying individual requirements of the user. The user may also lock the white balance adjusted currently, a camera device memorizes the white balance, and the white balance is automatically applied to another photographing environment, so as to acquire a special photograph effect so that the user can acquire a photograph with a unique artistic effect according to an individual requirement, thereby greatly improving the user experience.

What is claimed is:

1. A method for adjusting white balance, comprising steps of:

displaying a selection box for a user to select an area of a preview image, so as to define a colour temperature value by the user using the area of the preview image;

detecting the area defined by the selection box;

acquiring a colour temperature value defined by the user using the area of the preview image; and adjusting white balance according to the colour temperature value and a preset algorithm, wherein when there are a plurality of selection boxes, colour temperature values of preview images in areas defined by the plurality of selection boxes is calculated comprehensively, and wherein an average value or a weighted average value of the colour temperature values is calculated.

2. The method according to claim 1, wherein the area defined by the selection box is changed by at least one of following manners:

moving the selection box; and resizing the selection box.

3. The method according to claim 1, further comprising: after adjusting the white balance according to the colour temperature value and the preset algorithm, locking the adjusted white balance.

4. The method according to claim 1, further comprising: before adjusting the white balance, calibrating precision of the white balance.

5. A method for adjusting white balance, comprising steps of:

acquiring a colour temperature value defined by a user; and adjusting white balance according to the colour temperature value defined by the user and a preset algorithm, wherein acquiring the colour temperature value defined by the user comprises:

displaying a selection box for the user to select an area of a preview image to define a colour temperature value; detecting an area in the selection box and an area outside the selection box; and acquiring a weighted average value of a colour temperature value of the preview image in the area in the selection box and a colour temperature value of the preview image in the area outside the selection box, wherein the weighted average value is calculated by using an equation of:

$M=\alpha A+\beta b$, where A is the colour temperature value of the preview image in the area in the selection box, B is the colour temperature value of the preview image in the area outside the selection box, $\alpha$ is a weighting coefficient for A, and $\beta$ is a weighting coefficient for B.

6. The method for adjusting white balance according to claim 5, further comprising: after adjusting the white balance according to the colour temperature value and the preset algorithm, locking the adjusted white balance.

7. The method for adjusting white balance according to claim 5, further comprising: after acquiring the user-defined colour temperature value, calibrating precision of the white balance.

8. The method according to claim 5, wherein adjusting the white balance according to the colour temperature value defined by the user and a preset algorithm comprises:

applying the colour temperature value to a whole preview image and using the colour temperature value as a reference colour temperature for adjusting the white balance of the whole preview image; and adjusting the white balance according to a preset algorithm.

9. A device for adjusting white balance, comprising:

a display screen, and one or more processors executing computer readable instructions for a detecting unit and an adjusting module, wherein the display screen is configured to display a selection box for the user to select an area of a preview image to define a colour temperature; and the detecting unit is configured to detect an area in the selection box and an area outside the selection box, and to acquire a weighted average value of a colour temperature value of the preview image in the area in the selection box and a colour temperature value of the preview image in the area outside the selection box;

wherein the adjusting module is configured to adjust white balance according to the colour temperature value defined by the user and a preset algorithm, wherein the weighted average value is calculated by using an equation of:

$M=\alpha A+\beta b$, where A is the colour temperature value of the preview image in the area in the selection box, B is the colour temperature value of the preview image in the area outside the selection box, $\alpha$ is a weighting coefficient for A, and $\beta$ is a weighting coefficient for B.

10. The device for adjusting white balance according to claim 9, wherein the adjusting module is configured to lock the adjusted white balance.

11. The device for adjusting white balance according to claim 9, wherein the one or more processors further execute computer readable instructions for a calibrating module, wherein the calibrating module is configured to calibrate precision of the white balance.

12. The device according to claim 9, wherein the adjusting module is configured to:

apply the colour temperature value to a whole preview image and use the colour temperature value as a reference colour temperature for adjusting the white balance of the whole preview image; and adjust the white balance according to a preset algorithm.

* * * * *